United States Patent
Li et al.

(10) Patent No.: US 9,787,976 B2
(45) Date of Patent: Oct. 10, 2017

(54) DISPLAY DEVICE

(71) Applicants: Shanghai Tianma Micro-electronics Co., Ltd., Shanghai (CN); Tianma Micro-electronics Co., Ltd., Shenzhen (CN)

(72) Inventors: Jialing Li, Shanghai (CN); Zhongshou Huang, Shanghai (CN); Lei Niu, Shanghai (CN); Jun Ma, Shanghai (CN); Zhihua Ling, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 108 days.

(21) Appl. No.: 15/053,119

(22) Filed: Feb. 25, 2016

(65) Prior Publication Data

US 2017/0180716 A1 Jun. 22, 2017

(30) Foreign Application Priority Data

Dec. 21, 2015 (CN) .......................... 2015 1 0964967

(51) Int. Cl.
*G09G 3/00* (2006.01)
*H04N 13/04* (2006.01)
(Continued)

(52) U.S. Cl.
CPC ....... *H04N 13/0447* (2013.01); *G02B 3/0056* (2013.01); *G02B 27/2214* (2013.01); *G09G 3/003* (2013.01); *H04N 13/0404* (2013.01); *H04N 13/0406* (2013.01); *H04N 13/0497* (2013.01); *G09G 2300/0439* (2013.01);
(Continued)

(58) Field of Classification Search
CPC ........... H04N 13/0447; H04N 13/0404; H04N 13/0406; G02B 3/0056; G02B 27/2214; G09G 3/003
See application file for complete search history.

(56) References Cited

U.S. PATENT DOCUMENTS

| | | | |
|---|---|---|---|
| 5,712,731 A | 1/1998 | Drinkwater et al. | |
| 2010/0033813 A1 | 2/2010 | Rogoff | |
| 2017/0205877 A1* | 7/2017 | Qin | .................... G02B 27/0172 |

FOREIGN PATENT DOCUMENTS

| | | |
|---|---|---|
| CN | 101004873 A | 7/2007 |
| CN | 104575257 A | 4/2015 |

(Continued)

*Primary Examiner* — Abbas Abdulselam
(74) *Attorney, Agent, or Firm* — Anova Law Group, PLLC

(57) ABSTRACT

A display device is provided. The display device comprises a display panel including a plurality of display units, and a microlens array including a plurality of microlens elements disposed on top of a light emitting surface of the display panel. The plurality of microlens elements are one-to-one corresponding to the plurality of display units. In at least one direction of the display unit arrangement, a distance between a center of a microlens element and a center of the corresponding display unit gradually increases from a center of the display panel to an edge of the display panel. N number of adjacent display units together display an image and form a display unit group, wherein N is a positive integer larger than 1. Each display unit group displays a same image.

19 Claims, 13 Drawing Sheets

(51) Int. Cl.
*G02B 3/00* (2006.01)
*G02B 27/22* (2006.01)

(52) U.S. Cl.
CPC ............... *G09G 2310/0202* (2013.01); *G09G 2310/0267* (2013.01); *G09G 2310/0286* (2013.01); *G09G 2320/028* (2013.01)

(56) References Cited

FOREIGN PATENT DOCUMENTS

| | | | |
|---|---|---|---|
| CN | 105182553 | A | 12/2015 |
| JP | H08262371 | A | 10/1996 |
| WO | 0120386 | A2 | 3/2001 |

\* cited by examiner

DISPLAY DEVICE

CROSS-REFERENCES TO RELATED APPLICATIONS

This application claims the priority of Chinese patent application No. CN201510964967.6, filed on Dec. 21, 2015, the entire content of which is incorporated herein by reference.

FIELD OF THE DISCLOSURE

The present disclosure relates to the field of display technology and, more particularly, relates to a display device with improved viewing angle and viewing experience.

BACKGROUND

Display technology is developing along the direction towards high-definition and three-dimensional (3D) display. Different from a traditional two-dimensional (2D) display, a 3D display utilizes various approaches to introduce a depth perception to viewers, which enables the viewers to naturally or unnaturally obtain 3D information. As display technology develops, viewers often do not satisfy with display devices simply delivering 2D images, rather hope for display devices desired for displaying more vivid 3D images which are closer to human visual perception.

Conventional 3D display device is usually based a binocular parallax principle, in which a left view for a left eye and a right view for a right eye are separated by a lens or a grating and then received by the viewer's left eye and right eye, respectively. The viewer's brain fuses the left view and the right view to generate a visual perception of 3D display. However, the conventional 3D display usually provides limited viewing points, i.e., limited 3D viewing zones, which causes symptoms like headaches, nausea and etc., if the viewer watches the conventional 3D display for a long time.

Further, the 3D image performance degrades when the conventional 3D display is watched at off-angles. The 3D images displayed by the conventional 3D display cannot change along with a movement of the viewer's eyes. That is, 3D images corresponding to different viewing angles cannot be generated. Thus, the conventional 3D display is not able to provide the viewer an immersive 3D experience and the displayed images are not intuitive.

Floating image display devices solve the above-mentioned problems in the conventional 3D display, and the viewer is able to observe a floating image from different viewing angles. However, to realize a floating image often has a higher requirement of PPI (pixels per inch) and, thus, the area of each pixel is very small, resulting in a more difficult fabrication process of the floating image display devices.

The disclosed display device is directed to solve one or more problems in the art.

BRIEF SUMMARY OF THE DISCLOSURE

One aspect of the present disclosure provides a display device. The display device comprises a display panel including a plurality of display units, and a microlens array including a plurality of microlens elements disposed on top of a light emitting surface of the display panel. The plurality of microlens elements are one-to-one corresponding to the plurality of display units. In at least one direction of the display unit arrangement, a distance between a center of a microlens element and a center of the corresponding display unit gradually increases from a center of the display panel to an edge of the display panel. N number of adjacent display units together display an image and form a display unit group, wherein N is a positive integer larger than 1. Each display unit group displays a same image.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

The present disclosure provides a display device. The display device comprises a display panel including a plurality of display units, and a microlens array including a plurality of microlens elements disposed on top of a light emitting surface of the display panel. The plurality of microlens elements are one-to-one corresponding to the plurality of display units. In at least one direction of the display unit arrangement, a distance between a center of a microlens element and a center of the corresponding display unit gradually increases from a center of the display panel to an edge of the display panel. N number of adjacent display units together display an image and form a display unit group, wherein N is a positive integer larger than 1. Each display unit group displays a same image.

In the disclosed display devices, through configuring N number of adjacent display units to form a display unit group, in which each display unit group may display a same image, PPI (pixels per inch) in each display unit may be reduced substantially, and accordingly the fabrication difficulty of the display device may be reduced.

The display devices consistent with disclosed embodiments are described in details with illustrative figures. These figures are used for illustrative purposes and are not intended to limit the scope of the present invention. In a practical manufacturing, the figures of the display devices may further include spatial dimensions of the display devices, such as length, width and height.

Figure 1:
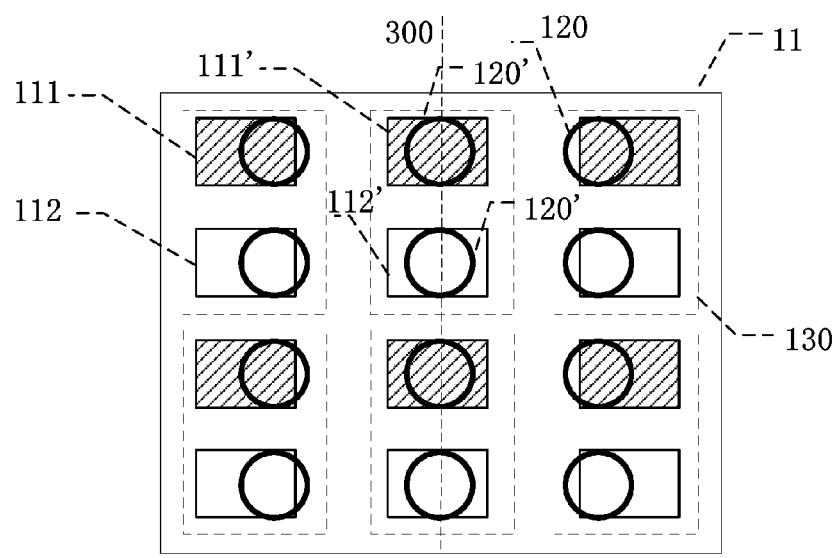
FIG. 1 illustrates a top view of an exemplary display device consistent with disclosed embodiments.

FIG. 1 illustrates a top view of an exemplary display device consistent with disclosed embodiments. As shown in FIG. 1, the display device may include a display panel 11 and a microlens array (not labeled). The display panel 11 may include a plurality of display units. The display unit may be any appropriate unit of display for displaying an image or an image element. For example, the display unit may be a pixel or a subpixel of an image, or the display unit may be a block of pixels (e.g., an array of pixels) with a predetermined size for displaying a number of pixels of an image or an image element.

The microlens array may include a plurality of microlens elements 120 disposed on top of a light emitting surface of the display panel 11. The plurality of microlens elements 120 may be one-to-one corresponding to the plurality of display units. Each microlens element 120 may include at least one microlens. The microlens element 120 may be coupled to the corresponding display unit 111 by a bonding means, such as glue, etc.

Further, N number of adjacent display units together may display an image and form a display unit group 130, where N is a positive integer larger than 1. Each display unit group may display a same image. For illustrative purposes, as shown in FIG. 1, two adjacent display units may form the display unit group 130, and the two adjacent display units together may display an image. That is, each of adjacent display units may display a portion of the image. For example, the display unit group 130, i.e., the two adjacent display units together, may display an element image, and each of the two adjacent display units may display a portion of the element image. Each display unit group 130 may display a same element image.

It should be noted that, as shown in FIG. 1, the plurality of the display units may be arranged in a matrix, i.e., a display unit matrix. That is, the plurality of display units may have a display unit arrangement of the display unit matrix. For example, two pixel units adjacent in a column direction of the display unit matrix may form the display unit group 130. In another embodiment, two pixel units adjacent in a row direction of the display unit matrix may form the display unit group 130.

In another embodiment, the plurality of display units may be arranged not in the display unit matrix, but may be arranged in irregular multiple rows and irregular multiple columns. For example, the display units may be radially arranged or distributed on the display panel. That is, the display unit arrangement may have a radial shape. Any two pixel units adjacent in any direction of the display unit arrangement (or any orientation of the display units) may form the display unit group 130.

The display unit group 130 in FIG. 1, which may be formed by two pixel units adjacent in the column direction of the display unit matrix, is only for illustrative purposes and is not intended to limit the scope of the present invention.

Compared to a floating image display device in which each display unit displays a same image, in the disclosed display device, each display unit group 130, which may be formed by a certain number of display units, may display a same image, i.e. an element image. Thus, image information required to be displayed by each display unit may be reduced, and the display unit structure may be simplified.

Further, as shown in FIG. 1, the plurality of the display units may be arranged in the display unit matrix. Along the row direction of the display unit matrix, a distance between a center of the microlens element 120 and a center of the corresponding display unit may gradually increase from a center of the display panel 11 to an edge of the display panel 11. In particular, along the row direction of the display unit matrix, the distance between the centers of two adjacent display units may be larger than the distance between the centers of two corresponding adjacent microlens elements 120.

For example, the center of the display unit 111' (display unit 121') disposed at a vertical center line 300 of the display panel 11 may coincide with the center of the corresponding microlens element 120' disposed at the vertical center line 300 of the display panel 11. Along the center of the display panel 11 to the edge of the display panel 11, the center of the display unit 111 may gradually deviate from the center of the corresponding microlens element 120. That is, the distance between the center of the microlens element 120 and the center of the corresponding display unit may gradually increase.

For example, the distance between the center of the microlens element 120 and the center of the corresponding display unit may gradually increase until the display unit and the microlens elements 120 are separated by a predetermined threshold distance. The threshold distance may be determined in advance based on the display units, display unit groups, the microlens elements 120, and/or the image displayed. For example, the maximum distance can be separated may be set such that the image displayed by the display unit group may not be able to be refracted by the corresponding microlens elements 120. That is, the display unit group and the corresponding microlens elements 120 are no longer overlapped.

Further, each display unit group 130 may include a first display unit 111 displaying a first image and a second display unit 112 displaying a second image. An image integrated by the first image and the second image may be the same as an image displayed by the display unit group 130.

After being refracted by the corresponding microlens element 120, each first display unit 111 may show different spatial angles of the first image, i.e., each refracted first image may include a different portion of the first image. The different portions of the first image may enter different viewing zones of the display panel 11, and may be fused into the first image floating in a space, i.e., the first floating image.

Similarly, after being refracted by the corresponding microlens element 120, each second display unit 112 may show different spatial angles of the second image, i.e., each refracted second image may include a different portion of the second image. The different portions of the second image may enter different viewing zones of the display panel 11, and may be fused into the second image floating in a space, i.e., the second floating image.

The first floating image and the second floating image may be integrated to be a whole image floating in the space (i.e., a whole floating image), which may be the same as the image displayed by the display unit group 130. The whole floating image may be a 3D floating image. The disclosed display device may be able to display a similar floating image as the floating image display device in which each display unit displays a same image.

As shown in FIG. 1, in the row direction of the display unit matrix, from the center of the display panel 11 to the edge of the display panel 11, the distance between the center of the microlens element 120 and the center of the corresponding display unit may gradually increase. When the viewer moves in the row direction of the display unit matrix, a relative position between the observed image and the display device may change along with the viewer's location.

Figure 2:
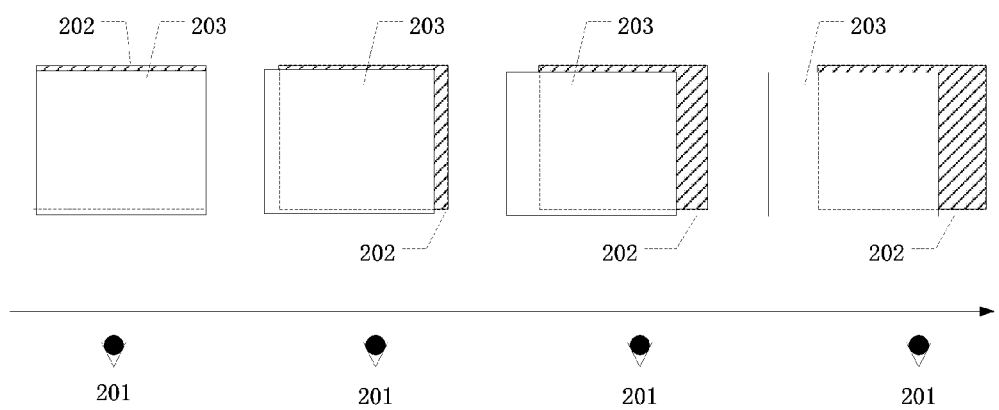
FIG. 2 illustrates images observed at different viewing positions in an exemplary display device in FIG. 1 consistent with disclosed embodiments.

FIG. 2 illustrates images observed at different viewing positions in an exemplary display device in FIG. 1 consistent with disclosed embodiments. As shown in FIG. 2, when a viewer has his/her eyes 201 exactly face a center of a display device 202, a floating image 203 may be displayed right in front of the display device 202.

When the viewer's eyes 201 move along a row direction (i.e. the direction of the arrow in FIG. 2), i.e., deviating from the center of the display device 202, a relative position between the floating image 203 and the display device 202 may change, revealing a right region of the display device 202. Similarly, when the viewer's eyes 201 move along an opposite direction of the arrow, the relative position between the floating image 203 and the display device 202 may also change, revealing a left region of the display device 202.

When the viewer's eyes move along the row direction, the relative position between the floating image 203 and the display device 202 may change, which may exhibit a similar effect as observing a real object when the viewer is in motion. Thus, the display device 202 may be able to display more realistic floating images. In addition, along with the movement of the viewer's eyes, the display device may display different floating images as viewed from different angles, which may be closer to the human visual perception in the real world and provide the viewer a fully immersive viewing experience.

Referring to FIG. 1, because of the one-to-one correspondence between the microlens element 120 and the display unit, each display unit group may display the same image. By configuring the relative positions between the microlens elements 120 and the corresponding display units, each portion of the image displayed by each display unit group 130 may be refracted by the corresponding microlens element 120 and then combined into one floating image.

Compared with the conventional display device utilizing a lens or a grating to separate the image into a left view entering the viewer's left eye and a right view entering the viewer's right eye, the disclosed display device may enable the viewer to observe the floating image within a 360-degree coverage of the display device, which may significantly widen the viewing angle as well as enhance the viewing experience. The floating image may offer a possibility of interactive operation, either directly using fingers or via 3D positioning devices. The 360° viewing angle may enable a group of people working together to stand around the display.

In certain embodiments, along the row direction of the display unit matrix, the distance between the centers of two adjacent display units may be smaller than the distance between the centers of two corresponding adjacent microlens elements 120.

Figure 3:
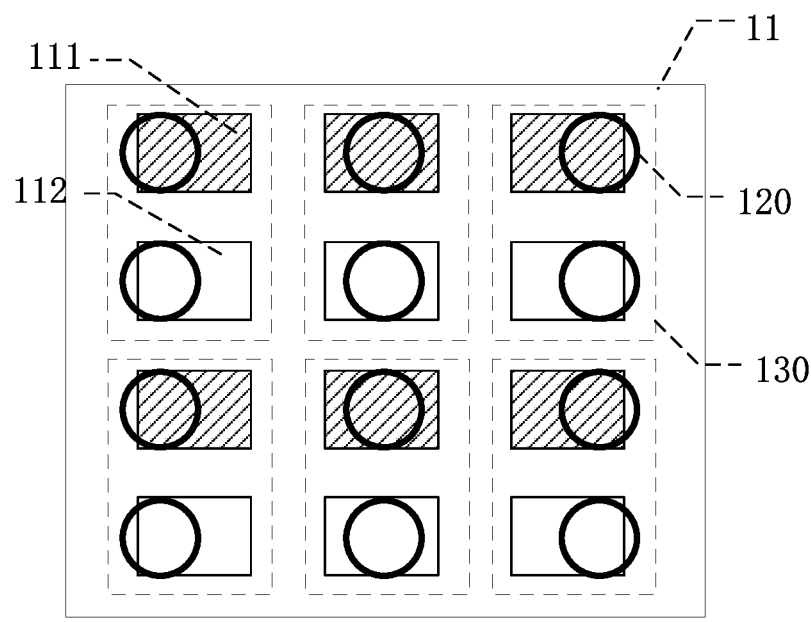
FIG. 3 illustrates a top view of another exemplary display device consistent with disclosed embodiments.

FIG. 3 illustrates a top view of another exemplary display device consistent with disclosed embodiments. The structure and working principle of the display device shown in FIG. 3 may be similar to the structure and working principle of the display device shown in FIG. 1, respectively. Thus, the similarities between FIG. 3 and FIG. 1 may be not repeated here, while certain difference may be emphasized.

As shown in FIG. 3, the plurality of the display units may be arranged in a matrix, i.e., a display unit matrix. Along the row direction of the display unit matrix, a distance between a center of the microlens element 120 and a center of the corresponding display unit may gradually increase from the center of the display panel 11 to the edge of the display panel 11. In particular, along the row direction of the display unit matrix, the distance between the centers of two adjacent display units may be smaller than the distance between the centers of two corresponding adjacent microlens elements 120. For example, the distance between two adjacent display units may be constant, while the distance between two adjacent microlens elements may increase gradually towards the edge of the display panel 11. Similar to the display device shown in FIG. 1, the display device shown in FIG. 3 may also be able to display a floating image.

For the display units arranged in matrix (i.e., display unit matrix), in certain embodiments, along a column direction of the display unit matrix, the distance between the center of the microlens element 120 and the center of the corresponding display unit may gradually increase from the center of the display panel 11 to the edge of the display panel 11.

Figure 4:
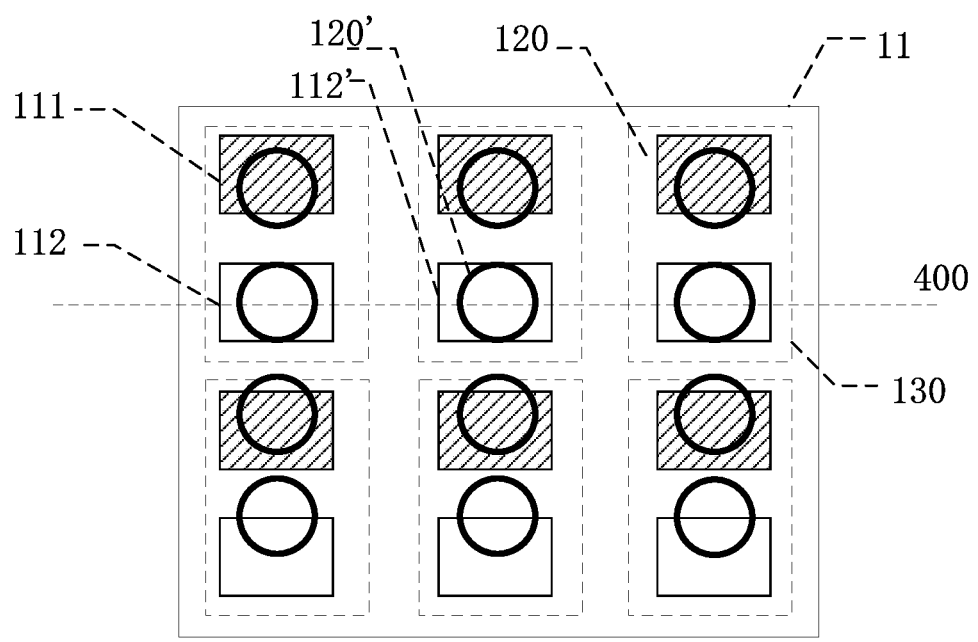
FIG. 4 illustrates a top view of another exemplary display device consistent with disclosed embodiments.

FIG. 4 illustrates a top view of another exemplary display device consistent with disclosed embodiments. As shown in FIG. 4, the center of a display unit 112' disposed at a horizontal center line 400 of the display panel 11 may coincide with a center of the corresponding microlens element 120' disposed at the horizontal center line 400 of the display panel 11. Along the center of the display panel 11 to the edge of the display panel 11, the center of the display unit may gradually deviate from the center of the corresponding microlens element 120. That is, the distance between the center of the microlens element 120 and the center of the corresponding display unit may gradually increase.

In particular, the distance between the center of the microlens element 120 and the center of the corresponding display unit may gradually increase until the display unit and the microlens elements 120 are separated by a predetermined threshold distance. The threshold distance may be determined in advance based on the display units, the microlens elements 120, and/or the image displayed. For example, the maximum distance can be separated may be set such that the image displayed by the display unit may not be able to be refracted by the corresponding microlens element 120. That is, the display unit and the corresponding microlens element 120 are no longer overlapped.

Further, along the column direction of the display unit matrix, the distance between the centers of two adjacent display units may be larger than the distance between the centers of two corresponding adjacent microlens elements 120. Similar to the display device shown in FIG. 1, the display device shown in FIG. 4 may also be able to display a floating image.

In certain embodiments, along the column direction of the display unit matrix, the distance between the centers of two adjacent display units may be smaller than the distance between the centers of two corresponding adjacent microlens elements 120. Such a display device may also be able to display a floating image.

Figure 5:
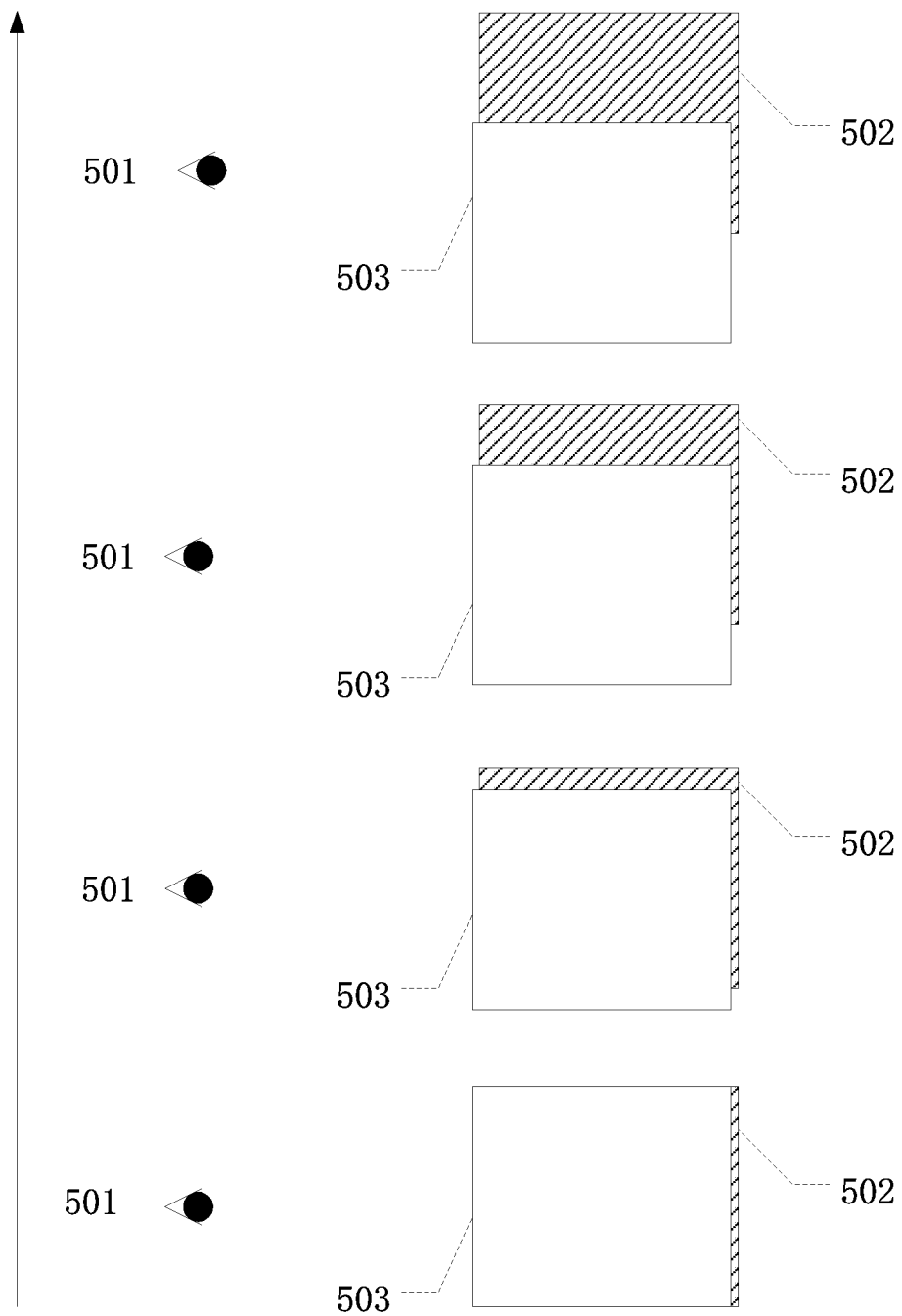
FIG. 5 illustrates images observed at different viewing positions in another exemplary display device in FIG. 4 consistent with disclosed embodiments.

FIG. 5 illustrates images observed at different viewing positions in another exemplary display device in FIG. 4 consistent with disclosed embodiments. As shown in FIG. 5, when a viewer has his/her eyes 501 exactly face a center of a display device 502, a floating image 503 may be displayed right in front of the display device 502.

When the viewer's eyes 501 move along a row direction (the direction of the arrow in FIG. 5), i.e., deviating from the center of the display device 502, a relative position between the floating image 503 and the display device 502 may change, revealing an upper region of the display device 502.

Similarly, when the viewer's eyes 501 move along an opposite direction of the arrow, the relative position between the floating image 503 and the display device 502 may also change, revealing a lower region of the display device 502. Thus, the display device may also be able to display more realistic floating images. In addition, along with the movement of the viewer's eyes, the display device may display different images as viewed from different angles, which may be closer to the human visual perception in the real world and provide the viewer a fully immersive viewing experience.

In certain embodiments, along both the row direction of the display unit matrix and the column direction of the display unit matrix, the distance between the center of the microlens element 120 and the center of the corresponding display unit may gradually increase from the center of the display panel 11 to the edge of the display panel 11.

Figure 6:
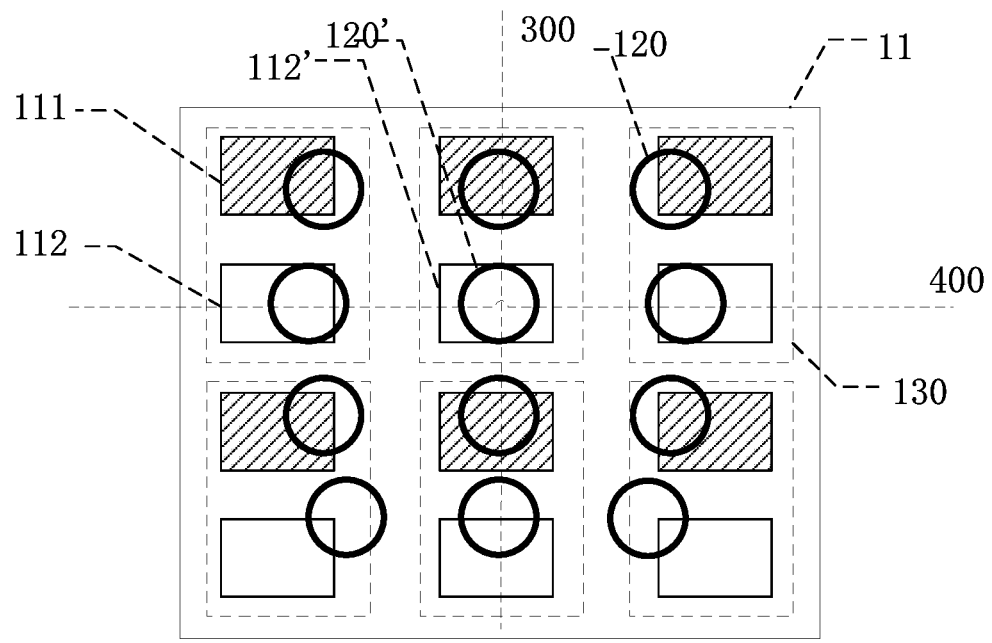
FIG. 6 illustrates a top view of another exemplary display device consistent with disclosed embodiments.

FIG. 6 illustrates a top view of another exemplary display device consistent with disclosed embodiments. As shown in FIG. 6, the center of a display unit 112' disposed at the center of the display panel 11 may coincide with the center of a microlens element 120' disposed at the center of the display panel 11. The center of the display panel 11 may be the intersection of the horizontal center line 400 and the vertical center line 300.

From the center of the display panel 11 to the edge of the display panel 11, the center of the display unit may gradually deviate from the center of the corresponding microlens element. That is, the distance between the center of the display unit and the center of the corresponding microlens element 120 may gradually increase in both the row direction of the display unit matrix and the column direction of the display unit matrix.

In particular, the distance between the center of the microlens element 120 and the center of the corresponding display unit may gradually increase until the display unit and the microlens elements 120 are separated by a predetermined threshold distance. The threshold distance may be determined in advance based on the display units, the microlens elements 120, and/or the image displayed. For example, the maximum distance can be separated may be set such that the image displayed by the display unit may not be able to be refracted by the corresponding microlens element 120. That is, the display unit and the corresponding microlens element 120 are no longer overlapped.

Further, along the column direction and the row direction of the display unit matrix, the distance between the centers of two adjacent display units may be larger than the distance between the centers of two corresponding adjacent microlens elements. Similar to the display device shown in FIG. 1, the display device shown in FIG. 6 may also be able to display a floating image. The floating image displayed by the disclosed display device may be able to change its relative position to the display device, no matter the viewer's eyes move in the row direction of the display unit matrix or the column direction of the display unit matrix.

In certain embodiments, along the column direction and the row direction of the display unit matrix, the distance between the centers of two adjacent display units may be smaller than the distance between the centers of two corresponding adjacent microlens elements. The disclosed display device may also be able to display a floating image. The floating image may be able to change its relative position to the display device, no matter the viewer's eyes move in the row direction of the display unit matrix or the column direction of the display unit matrix.

Figure 7:
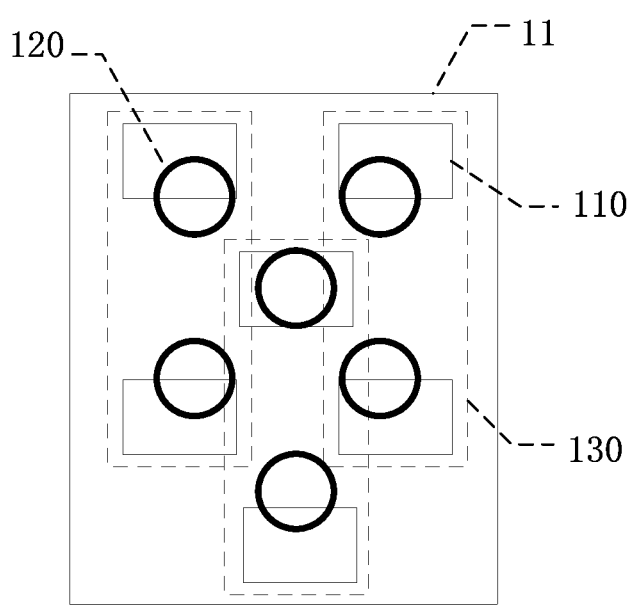
FIG. 7 illustrates a top view of another exemplary display device consistent with disclosed embodiments.

FIG. 7 illustrates a top view of another exemplary display device consistent with disclosed embodiments. As shown in FIG. 7, the display device may include a display panel 11 and a microlens array (not labeled in FIG. 7). The display panel 11 may include a plurality of display units 110. The display unit 110 may be any appropriate unit of display for displaying an image or an image element. For example, the display unit may be a pixel or a subpixel of an image, or the display unit may be a block of pixels (e.g., an array of pixels) with a predetermined size for displaying a number of pixels of an image or an image element.

The microlens array may include a plurality of microlens elements 120 disposed on top of a light emitting surface of the display panel 11. The plurality of microlens elements 120 may be one-to-one corresponding to the plurality of display units. Each microlens element 120 may include at least one microlens. The microlens element 120 may be coupled to the corresponding display unit 111 by a bonding means, such as glue, etc.

Further, N number of adjacent display units together may display an image and form a display unit group 130, where N is a positive integer larger than 1. Each display unit group may display a same image. For illustrative purposes, as shown in FIG. 7, two adjacent display units together may display an image and form the display unit group 130.

The plurality of display units 110 may be arranged in multiple rows and multiple columns, and the display units 110 disposed in two adjacent rows may be staggered in the column direction. Along a row direction and/or a column direction, from the center of the display panel 11 to the edge of the display panel 11, the center of the display unit 110 may gradually deviate from the center of the corresponding microlens element 120. That is, the distance between the center of the microlens element 120 and the center of the corresponding display unit 110 may gradually increase.

In particular, the distance between the center of the microlens element 120 and the center of the corresponding display unit 110 may gradually increase until the display unit 110 and the microlens elements 120 are separated by a predetermined threshold distance. The threshold distance may be determined in advance based on the display units 110, the microlens elements 120, and/or the image displayed. For example, the maximum distance can be separated may be set such that the image displayed by the display unit 110 may not be able to be refracted by the corresponding microlens element 120. That is, the display unit 110 and the corresponding microlens element 120 are no longer overlapped, and light from the image displayed by the display unit 110 is no longer refracted by the corresponding microlens element 120.

As shown in FIG. 7, the display units 110 disposed in two adjacent rows may be staggered in the column direction, which may enable a more uniform distribution of the display units 110 in the display panel 11. Thus, the floating image may have an improved uniformity. In addition, an image crosstalk causing ghost images, heavy contours, image blurring and etc., may be prevented from affecting the image quality and the visual comfort.

Further, along both the row direction of the display unit arrangement and the column direction of the display unit arrangement, the distance between the centers of two adjacent display units may be larger than the distance between the centers of two corresponding adjacent microlens elements. Similar to the display device shown in FIG. 1, the display device shown in FIG. 7 may also be able to display an image floating in a space, i.e., a floating image.

In certain embodiments, along both the row direction of the display unit arrangement and the column direction of the display unit arrangement, the distance between the centers of two adjacent display units may be smaller than the distance between the centers of two corresponding adjacent microlens elements.

Figure 8:
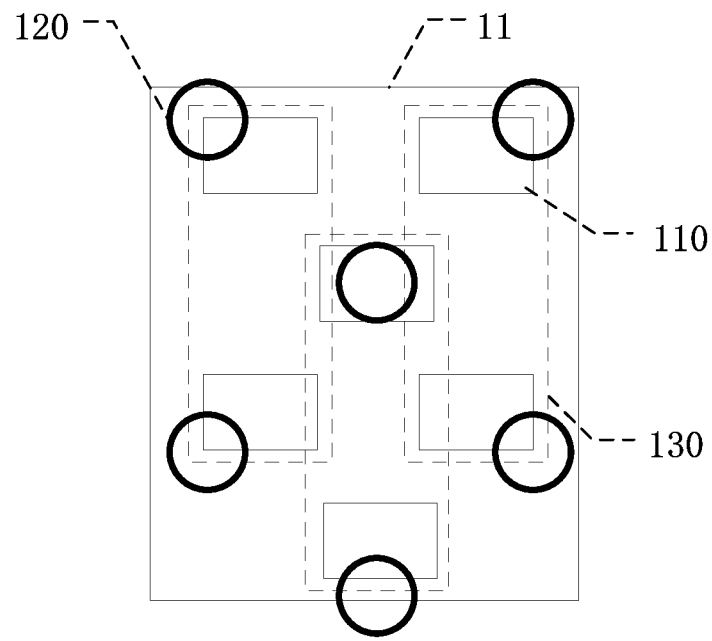
FIG. 8 illustrates a top view of another exemplary display device consistent with disclosed embodiments.

FIG. 8 illustrates a top view of another exemplary display device consistent with disclosed embodiments. The display device shown in FIG. 8 may have a similar structure as the display device shown in FIG. 7. Thus, the similarities between FIG. 8 and FIG. 7 may not be repeated here, while certain difference may be illustrated.

As shown in FIG. 8, the plurality of display units 110 may be arranged in multiple rows and multiple columns, and the display units 110 disposed in two adjacent rows may be staggered in the column direction. Along a row direction and/or a column direction, from the center of the display panel 11 to the edge of the display panel 11, the center of the display unit may gradually deviate from the center of the corresponding microlens element 120. That is, the distance between the center of the microlens element 120 and the center of the corresponding display unit 110 may gradually increase.

In particular, along both the row direction of the display unit arrangement and the column direction of the display unit arrangement, the distance between the centers of two adjacent display units may be smaller than the distance between the centers of two corresponding adjacent microlens elements. The display device shown in FIG. 8 may also be able to display a floating image.

It should be noted that, in FIG. 1, FIGS. 3-4, and FIGS. 6-8, the display units are disposed in four rows and three columns, which is only for illustrative purposes and is not intended to limit the scope of the present invention. Any number of rows and/or columns may be included.

Further, from the center of the display panel to the edge of the display panel, the distance between the center of the microlens element and the center of the corresponding display unit may gradually increase along every direction of the display unit arrangement. That is, the center of the display panel may be the center of a circle, the display units may be arranged along the radius of the circle, and the distance between the center of the microlens element and the center of the corresponding display unit may gradually increase from the center of the display panel to the edge of the display panel.

Figure 9:
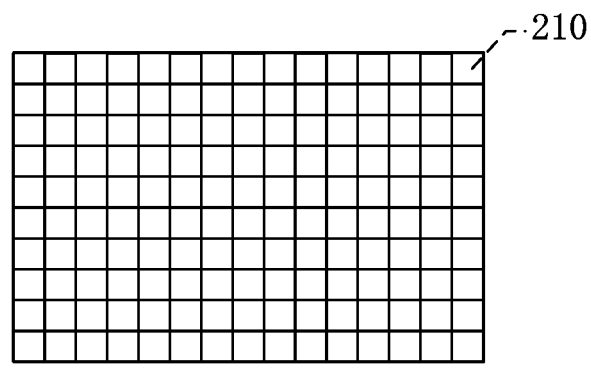
FIG. 9 illustrates a top view of an exemplary display unit consistent with disclosed embodiments.

FIG. 9 illustrates a top view of another exemplary display unit consistent with disclosed embodiments. As shown in FIG. 9, each display unit may include a plurality of pixel units 210, which may be arranged in a matrix, i.e., a pixel unit matrix, and each pixel unit may include a plurality of pixels. Further, each pixel unit may include a display region and a non-display region.

It should be noted that, in FIG. 9, the pixel units 210 are disposed in 10 rows and 15 columns, which is only for illustrative purposes and is not intended to limit the scope of the present invention. Any number of rows and/or columns may be included in the pixel unit matrix. In practical applications, the number of pixel units 210 and the arrangement of the pixel units 210 (i.e., pixel unit arrangement) may be adjusted according to various display requirements.

In particular, the display unit in each display unit group displaying the same image may have the same number of pixel units 210 and the same arrangement of pixel units 210. For example, referring to FIG. 1, the first display unit 111 in each display unit group 13 may have the same number of pixel units 210 and the same arrangement of pixel units 210. The second display unit 112 in each display unit group 130 may have the same number of pixel units 210 and the same arrangement of pixel units 210. Further, in one embodiment, the first display unit 111 and the second display unit 112 may have the same number of pixel units 210 and the same arrangement of pixel units 210. In another embodiment, the first display unit 111 and the second display unit 112 may have a different number of pixel units 210 and/or a different arrangement of pixel units 210.

Returning to FIG. 9, along a row direction of the pixel unit matrix, each pixel unit may be equally divided into N portions (i.e., the $1^{st}$ portion, the $2^{nd}$ portion . . . the $N^{th}$ portion). On the other hand, each display unit group may include N number of display units (i.e. the $1^{st}$ display unit, the $2^{nd}$ display unit . . . the $N^{th}$ display unit). That is, each display unit group may include N number of display units, each display unit may include a plurality of pixel units arranged in the pixel unit matrix, and each pixel unit may be equally divided into N portions along the row direction of the pixel unit matrix.

Further, along the row direction of the pixel unit matrix, the display region of the pixel units in each display unit in the display unit group may be sequentially disposed at the first portion to the $N^{th}$ portion. That is, the display region of each pixel unit in the $1^{st}$ display unit in the display unit group may be disposed at the $1^{st}$ portion of each pixel unit, and the display region of each pixel unit in the $N^{th}$ display unit in the display unit group may be disposed at the $N^{th}$ portion of each pixel unit.

For example, in the $1^{st}$ display unit, the $1^{st}$ portion in each pixel unit may be the display region of each pixel unit, while the other portions in each pixel unit may be the non-display region of each pixel unit. In the $2^{nd}$ display unit, the $2^{nd}$ portion in each pixel unit may be the display region of each pixel unit, while the other portions in each pixel unit may be the non-display region of each pixel unit, and so on. Thus, in the $N^{th}$ display unit, the $N^{th}$ portion in each pixel unit may be the display region of each pixel unit, while the other portions in each pixel unit may be the non-display region of each pixel unit.

It should be noted that, each display unit in the display unit group may display a portion of a whole image, and all the display units in the display unit group together may display the whole image. In each display unit having a plurality of pixel units arranged in the pixel unit matrix, each pixel unit may be equally divided into N portions in the row direction of the pixel unit matrix, where N may be the number of the display units included in each display unit group. Meanwhile, each display unit (i.e., the display region of each pixel unit included in the display unit) in the display unit group may display a corresponding portion of the whole image. Thus, eventually the whole image may be integrated and displayed.

For example, when each display unit group includes two display units (i.e., the $1^{st}$ display unit, the $2^{nd}$ display unit), each pixel unit in each display unit may be equally divided into two portions (i.e., the $1^{st}$ portion, the $2^{nd}$ portion) along the row direction of the pixel unit matrix. In particular, in the $1^{st}$ display unit, the $1^{st}$ portion in each pixel unit may be the display region, while the $2^{nd}$ portion in each pixel unit may be the non-display region. In the $2^{nd}$ display unit, the $2^{nd}$ portion in each pixel unit may be the display region, while the $1^{st}$ portion in each pixel unit may be the non-display region.

When each display unit group includes three display units (i.e., the $1^{st}$ display unit, the $2^{nd}$ display unit, the $3^{rd}$ display unit), each pixel unit included in each display unit may be equally divided into three portions (i.e., the $1^{st}$ portion, the $2^{nd}$ portion, the $3^{rd}$ portion) along the row direction of the pixel unit matrix. In particular, in the $1^{st}$ display unit, the $1^{st}$ portion in each pixel unit may be the display region, while the $2^{nd}$ portion and the $3^{rd}$ portion in each pixel unit may be the non-display region. In the $2^{nd}$ display unit, the $2^{nd}$ portion in each pixel unit may be the display region of each pixel unit, while the $1^{st}$ portion and the $3^{rd}$ portion in each pixel unit may be the non-display region. In the $3^{rd}$ display unit, the $3^{rd}$ portion in each pixel unit may be the display region of each pixel unit, while the $1^{st}$ portion and the $2^{nd}$ portion in each pixel unit may be the non-display region.

Figure 10A:
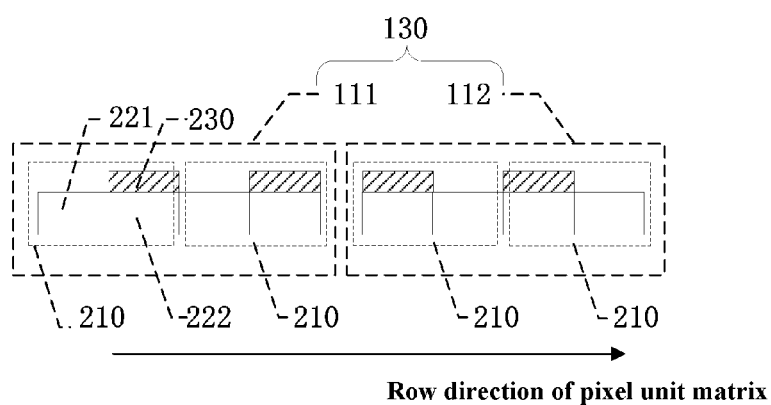
FIG. 10a illustrates a cross-sectional view of another exemplary display unit group consistent with disclosed embodiments.

For illustrative purposes, in one embodiment, each display unit group may include two display units, while each display unit may include two pixel units. FIG. 10a illustrates a cross-sectional view of an exemplary display unit group consistent with disclosed embodiments. As shown in FIG. 10a, the display unit group 130 may include a first display unit 111 and a second display unit 112, in which each display unit group may include two pixel units 210. On the other hand, each pixel units 210 may include a display region 221 and a non-display region 222. In the first display unit 111, the display region 221 in each pixel unit 210 may have a same relative position with respect to the pixel unit 210. In the second display unit 112, the display region 221 in each pixel unit 210 may have a same relative position with respect to the pixel unit 210.

As shown in FIG. 10a, the arrow may denote the direction of the pixel unit 210 matrix. Along the row direction of the pixel unit matrix, each pixel unit may be equally divided into two portions, which may correspond to the display region 221 and the non-display region 222, respectively. A black matrix 230 may be disposed on the non-display region 222 in each pixel unit 210.

In particular, in the first display unit 111, the display region 221 of each pixel unit 210 may be the first portion, the non-display region 222 of each pixel unit 210 may be the second portion. In the second display unit 112, the display region 221 of each pixel unit 210 may be the second portion, the non-display region 222 of each pixel unit 210 may be the first portion.

Thus, in the display unit group 130, an image displayed by the first display unit 111 and an image displayed by the second display unit 112 may be integrated to be a whole image. Further, a plurality of display unit groups 130 may work together to realize an image floating in a space, i.e., a floating image. The viewer may be able to observe the floating image from multiple viewing angles or in multiple viewing zones.

It should be noted that, in the disclosed embodiments, each pixel unit may be equally divided into two portions in the row direction of the pixel unit matrix, which is for illustrative purposes and is not intended to limit the scope of the present invention. According to various display requirements, each pixel unit may be equally divided into any positive integer of portions in the row direction of the pixel unit matrix.

Figure 10B:
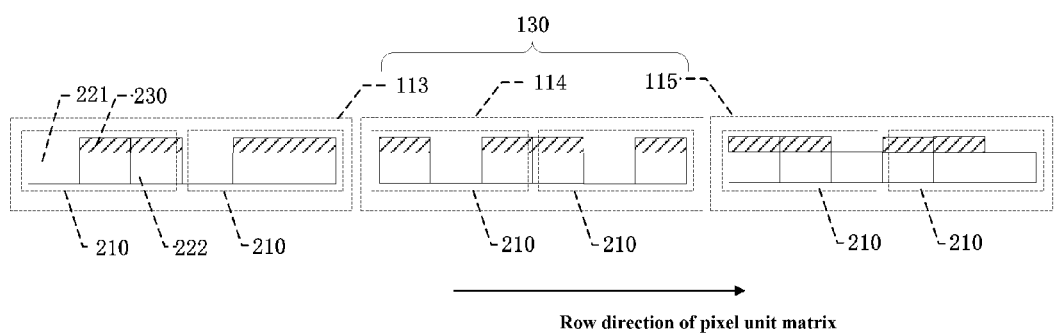
FIG. 10b illustrates a cross-sectional view of another exemplary display unit group consistent with disclosed embodiments.

Again, for illustrative purposes, in one embodiment, each display unit group may include three display units, while each display unit may include two pixel units. FIG. 10b illustrates a cross-sectional view of another exemplary display unit group consistent with disclosed embodiments. As shown in FIG. 10b, the display unit group 130 may include three display units: a third display unit 113, a fourth display unit 114 and a fifth display unit 115, in which each display unit group may include two pixel units 210.

Along the row direction of the pixel unit matrix, each pixel unit 210 may be equally divided into three portions: a first portion, a second portion, and a third portion. On the other hand, each pixel units 210 may include the display region 221 and the non-display region 222.

In particular, in the third display unit 113, the display region 221 of each pixel unit 210 may be the first portion, the non-display region 222 of each pixel unit 210 may be the second portion and the third portion. In the fourth display unit 114, the display region 221 of each pixel unit 210 may be the second portion, the non-display region 222 of each pixel unit 210 may be the first portion and the third portion. In the fifth display unit 115, the display region 221 of each pixel unit 210 may be the third portion, the non-display region 222 of each pixel unit 210 may be the first portion and the second portion.

Thus, in the display unit group 130, an image displayed by the third display unit 113, an image displayed by the fourth display unit 114 and an image displayed by the fifth display unit 115 may be integrated to be a whole image. Further, a plurality of display unit groups 130 may work together to realize an image floating in a space, i.e., a floating image. The viewer may be able to observe the floating image from multiple viewing angles or in multiple viewing zones.

It should be noted that, the pixel unit 210 having a same size as the display region 221 may also be fabricated, however, the size of the pixel unit 210 may be very small, and the fabrication difficulty may be increased accordingly. In FIG. 10a and FIG. 10b, each pixel unit 210 may have a larger size than the display region 221, and the non-display region 222 may be covered by the black matrix 230. Thus, the fabrication difficult may be decreased. Further, the non-display region 222 covered by the black matrix 230 may provide a hidden space for disposing other devices, components or wirings.

Figure 11:
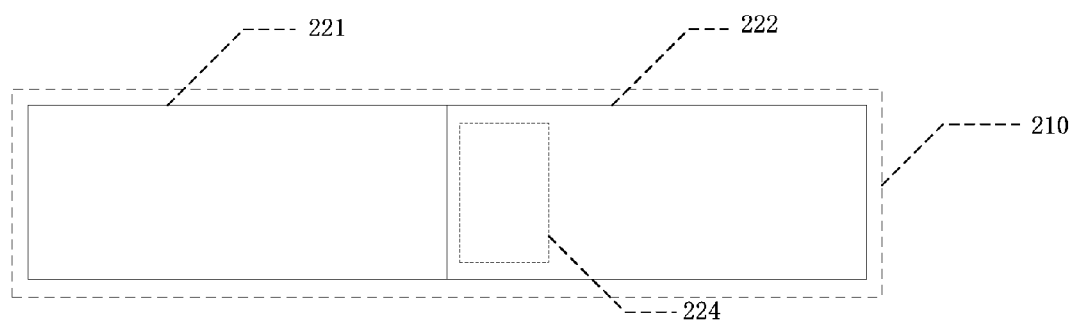
FIG. 11 illustrates a top view of an exemplary pixel unit consistent with disclosed embodiments.

FIG. 11 illustrates a top view of an exemplary pixel unit consistent with disclosed embodiments. As shown in FIG. 11, the pixel unit 210 may include the display region 221 and the non-display region 222 covered by a black matrix. The pixel unit 210 may include a thin film transistor (TFT) 224, which may be disposed in the non-display region 222. In particular, the TFT 224 may be disposed at one side of the black matrix, which may be adjacent to a light source. Such a design may save the space in the pixel unit and increase the aperture ratio of a pixel unit electrode. FIG. 11 illustrates a top view of a single pixel unit, and each pixel unit 210 included in the display device may have the same structure.

Figure 12:
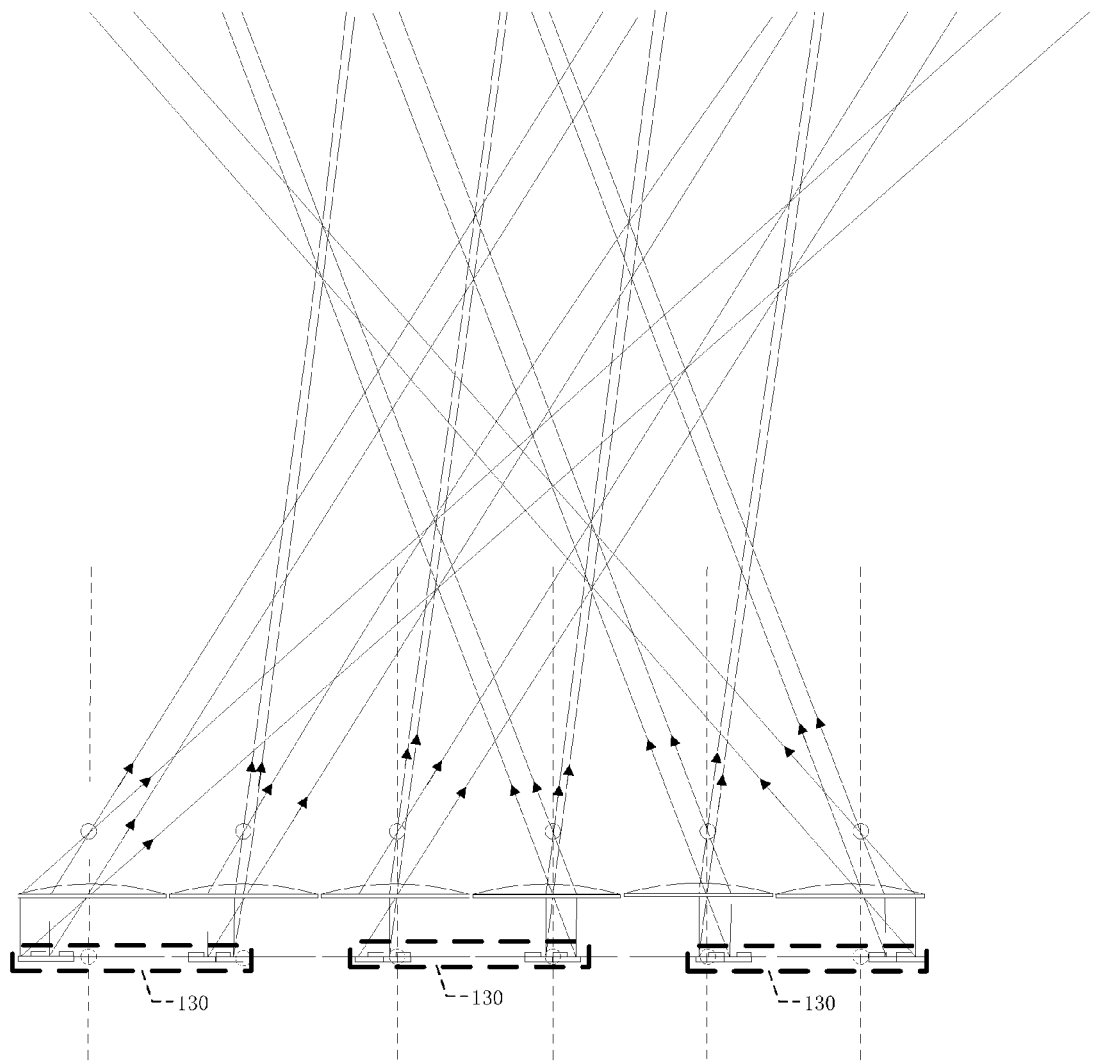
FIG. 12 illustrates an exemplary operation principle of an exemplary display device consistent with disclosed embodiments.
Figure 13:
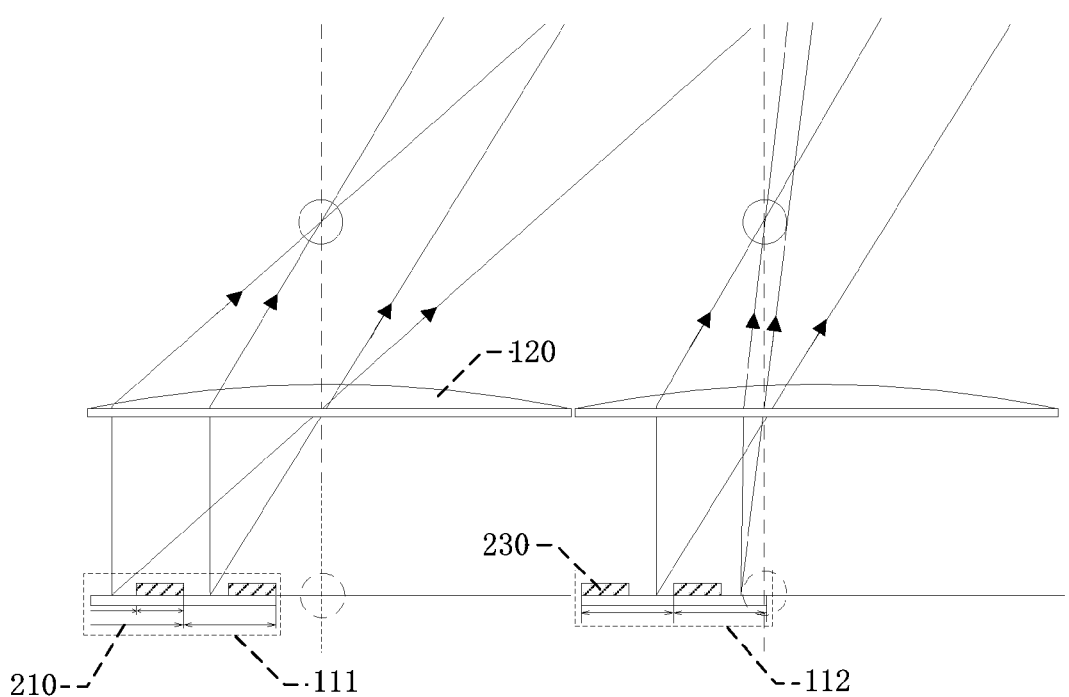
FIG. 13 illustrates an enlarged display unit group in an exemplary display device in FIG. 12 consistent with disclosed embodiments.

FIG. 12 illustrates an exemplary operation principle of an exemplary display device consistent with disclosed embodiments. As shown in FIG. 12, a plurality of display unit groups 130 may work together to realize an image floating in a space, i.e., a floating image. The viewer may be able to observe the floating image from multiple viewing angles or in multiple viewing zones. FIG. 13 illustrates an enlarged a display unit group in the display device shown in FIG. 12.

As shown in FIG. 13, the display unit group may include a first display unit 111 and a second display unit 112. Each display unit may include two pixel units 210, and each pixel unit may include a display region and a non-display region.

Along the row direction of the pixel unit matrix, each pixel unit 210 may be equally divided into two portions: a first portion and a second portion. In the first display unit 111, the display region of each pixel unit 210 may be the first portion, the non-display region of each pixel unit 210 may be the second portion. In the second display unit 112, the display region of each pixel unit 210 may be the second portion, the non-display region of each pixel unit 210 may be the first portion. The non-display region in each pixel unit may be covered by a black matrix 230.

Further, each display unit (i.e., the first display unit 111 and the second display unit 112) may correspond to one microlens element 120, while a relative position between the center of each display unit and the center of the corresponding microlens element 120 may be different. Light emitted from a light source (e.g., a backlight source) may transmit through the display region of each pixel unit in the first display units 111 and the second display units 112, and then may be refracted by the corresponding microlens elements 120 to corresponding viewing zone of the display device.

Thus, referring to FIG. 13 and FIG. 12, when the plurality of display unit groups 130 work together, the floating image may be realized, and the viewer may be able to observe the floating image from multiple viewing angles or in multiple viewing zones.

Figure 14:
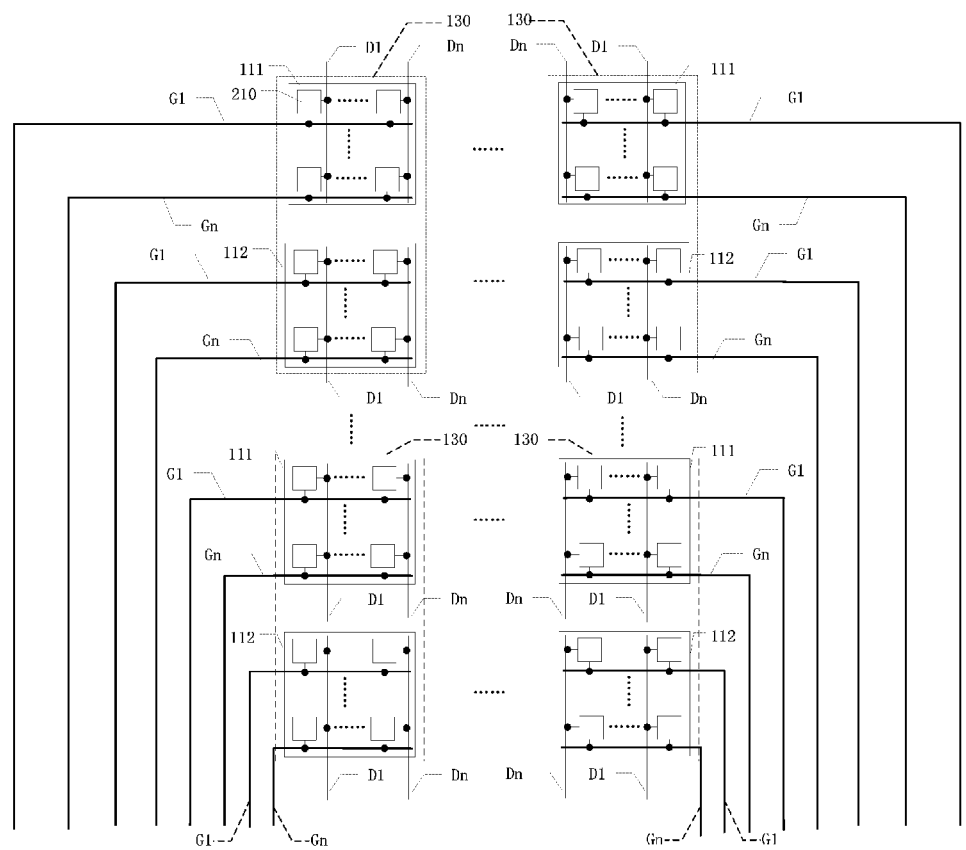
FIG. 14 illustrates another exemplary display device consistent with disclosed embodiments.

FIG. 14 illustrates another exemplary display device consistent with disclosed embodiments. As shown in FIG. 14, the display device may include a plurality of display unit groups 130, and each display unit group 130 may include a first display unit 111 and a second display unit 112. Each display unit may include a plurality of pixel units 210, which may be arranged in an n×n matrix, where n is a positive integer.

The display device may further include a plurality of scanning lines Gn and a plurality of data lines Dn, which may provide scanning signals and data signals to the pixel units 210 in each display unit respectively. Each display unit may have its own scanning lines Gn and its own data lines Dn, which may be connected to corresponding interfaces of a display driving chip through wires, respectively.

It should be noted that, each display unit may have its own scanning lines Gn and its own data lines Dn. Thus, the first display unit 111 and the second display unit 112, in which each display unit may display a different image, may be individually controlled through the corresponding scanning lines Gn and the corresponding data lines Dn, satisfying the image display requirements, i.e., displaying a different image. The two different images together may form an element image.

Figure 15:
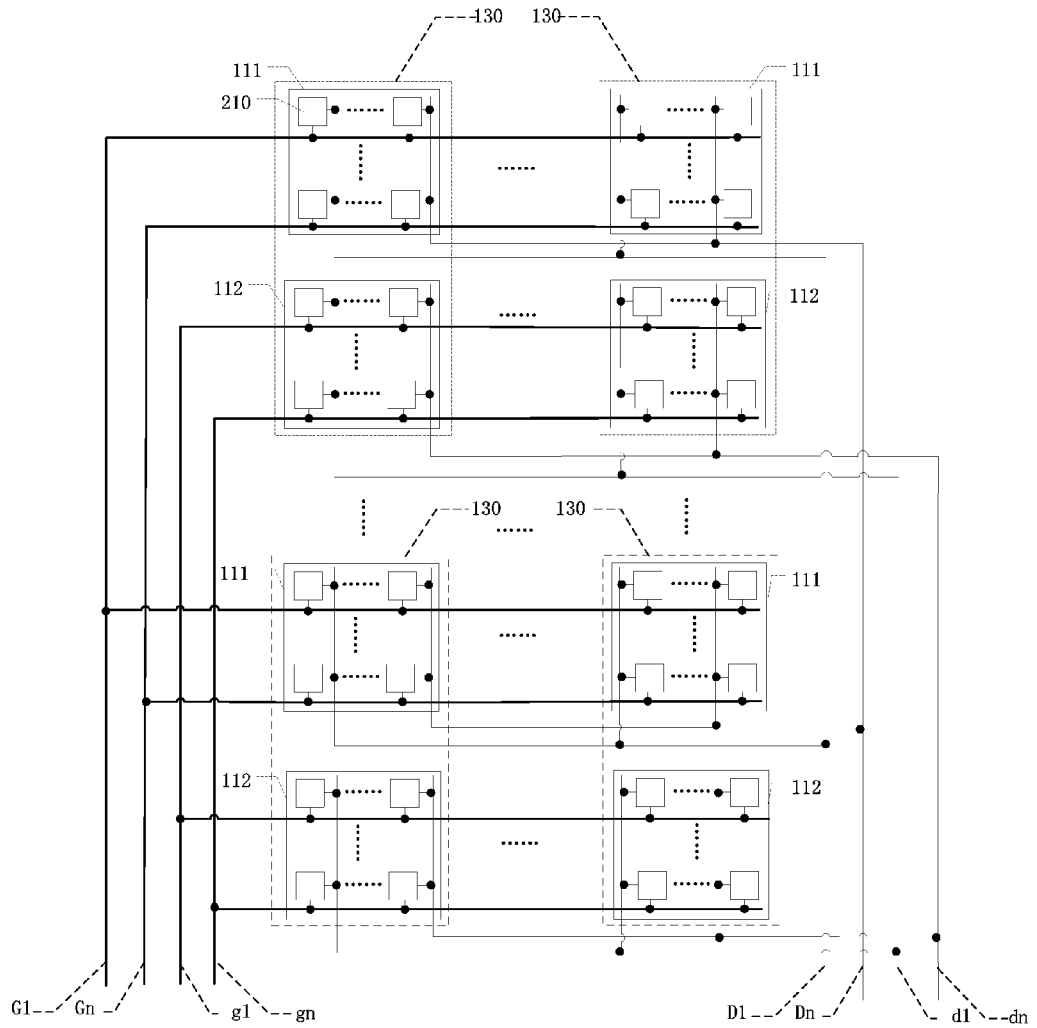
FIG. 15 illustrates another exemplary display device consistent with disclosed embodiments.

FIG. 15 illustrates another exemplary display device consistent with disclosed embodiments. The display device shown in FIG. 15 may be similar to the display device shown in FIG. 14. Thus the similarities between the FIG. 15 and FIG. 14 may not be repeated here, while certain differences may be emphasized.

As shown in FIG. 15, the display device may further include a plurality of scanning lines Gn (gn) and a plurality of data lines Dn (dn) which may provide scanning signals and data signals to the pixel units 210 in each display unit respectively, where n is a positive integer.

The plurality of display unit groups 130 may share the plurality of scanning lines and the plurality of data lines. Because each display unit group 130 may display a same image, sharing the plurality of scanning lines and the plurality of data lines among the plurality of display unit groups 130 may reduce the number of interfaces of a display driving chip, the number of the scanning lines and the number of the data lines. Thus, fabrication costs may be reduced accordingly.

For example, as shown in FIG. 15, each display unit group 130 may include a first display unit 111 and a second display unit 112. The first display unit 111 and the second display unit 112 together may display a whole image. In particular, in the plurality of display unit group 130, each first display unit 111 may display a same image content, and all the first display units 111 may share the scanning lines G1 to Gn and the data lines D1 to Dn. Meanwhile, each second display unit 112 may display a same image content, and all the second display units 112 may share the scanning lines g1 to gn and the data lines d1 to dn.

Figure 16:
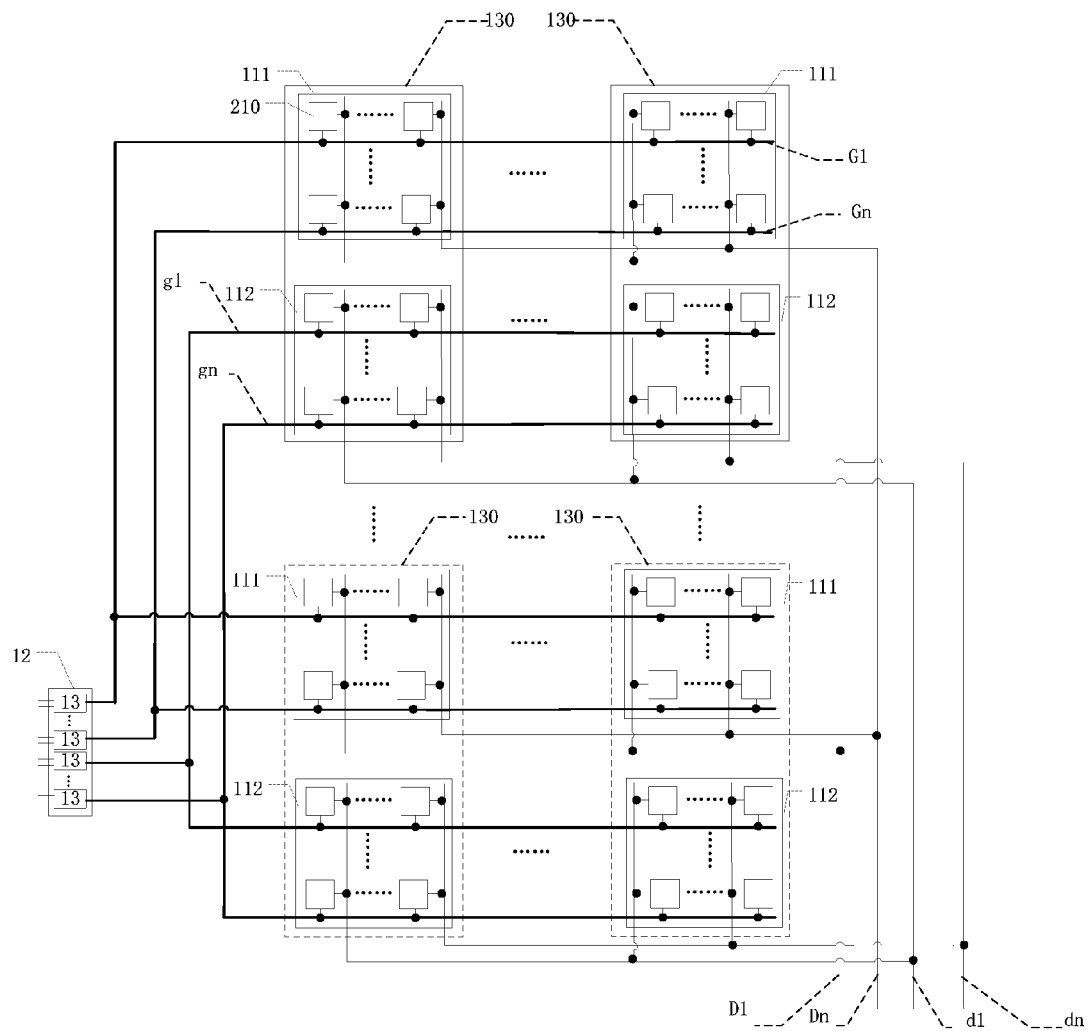
FIG. 16 illustrates another exemplary display device consistent with disclosed embodiments.

FIG. 16 illustrates another exemplary display device consistent with disclosed embodiment. The similarities between the FIG. 15 and FIG. 16 may not be repeated here, while certain differences may be emphasized. In particular, the display device shown in FIG. 16 may be further optimized as compared to the display device shown in FIG. 15.

As shown in FIG. 16, the display device may include a plurality of scanning lines and a plurality of data lines, which may provide scanning signals and data signals to the pixel units 210 in each display unit respectively. The display device may further include a gate electrode driving circuits 12, which may be disposed in a non-displaying region of a display panel.

The gate electrode driving circuit 12 may include a plurality of cascaded shift registers 13, which may be respectively connected to the corresponding scanning lines Gn or $g_n$ and provide the scanning signal to the pixel units 210 in each display unit respectively. In the disclosed embodiments, the gate electrode driving circuit 12 capable of driving gates of transistors may be integrated on the display panel. Thus, the cost of a display driving chip may be reduced. Further, the gate electrode driving circuits 12 may be simultaneously formed when fabricating the transistors (e.g., TFTs) on the display panel.

Figure 17:
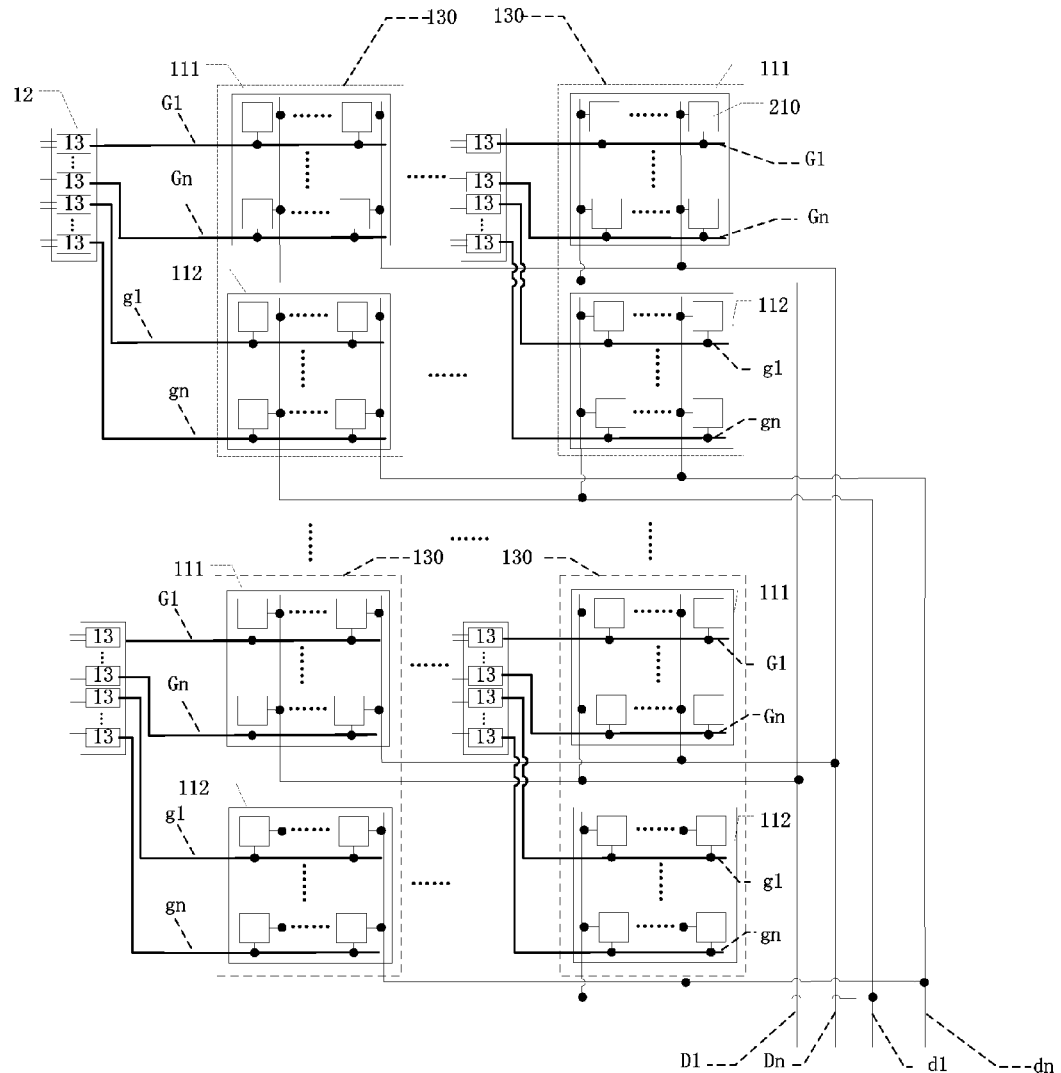
FIG. 17 illustrates another exemplary display device consistent with disclosed embodiments.

FIG. 17 illustrates another exemplary display device consistent with disclosed embodiments. The similarities between the FIG. 16 and FIG. 17 may not be repeated here, while certain differences may be emphasized.

As shown in FIG. 17, the display device may further include a plurality of scanning lines and a plurality of data lines, which may provide scanning signals and data signals to the pixel units 210 in each display unit respectively. The display device may further include a plurality of gate electrode driving circuits 12, which may be one-to-one corresponding to the plurality of display unit groups 130. The gate electrode driving circuits 12 may be disposed in a non-displaying region of a display panel.

The gate electrode driving circuit 12 may include a plurality of cascaded shift registers 13, which may be connected to the corresponding scanning lines Gn or $g_n$, and provide the scanning signal to the pixel units 210 in each display unit respectively. When each display unit group 130 contains a large number of pixel units while the plurality of display unit groups 130 share the same gate electrode driving circuit 12, a large number of the scanning lines may have to be disposed among the adjacent display unit groups 130 in a same row. Thus, a light transmission area in the display device may shrink.

In the disclosed embodiments, each display unit group 130 may be assigned with a corresponding gate electrode driving circuit 12. Thus, a large number of the scanning lines may not have to be disposed among the adjacent display unit groups 130 in the same row, and the light transmission area in the display device may be expanded. It should be noted that, ports in different gate electrode driving circuits 12 which input a same signal may use a same signal line (i.e. a same data line or a same scanning line), which may further reduce the number of the wires in the display device.

It should be noted that, the display devices shown in FIGS. 15-17 may be similar to each other, and the same reference numbers are used throughout the drawings to refer to the same or like parts. The similarities of the display devices shown in FIGS. 15-17 may not be repeated here.

The display panel included in the disclosed display devices may be any one of a liquid crystal display panel (LCD), a plasma display panel (PDP), a cathode ray tube (CRT) display panel, an organic light emitting display (OLED) panel, etc.

The display unit included in the disclosed display devices may have any one of a circular shape, a polygonal shape, an irregular shape and etc. The rectangular-shaped display unit shown in FIGS. 1-17 is only for illustrative purposes, and is not intended to limit the scope of the present invention.

Further, the microlens element may have a hemispherical shape and, thus, the microlens element may transmit a same amount of light in different directions. The viewer may be able to observe a uniform image at different viewing directions and the image crosstalk may be prevented.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A display device, comprising:
a display panel including a plurality of display units having a display unit arrangement; and
a microlens array including a plurality of microlens elements disposed on top of a light emitting surface of the display panel,
wherein the plurality of microlens elements are one-to-one corresponding to the plurality of display units,
in at least one direction of the display unit arrangement, a distance between a center of a microlens element and a center of the corresponding display unit gradually increases from a center of the display panel to an edge of the display panel,
N number of adjacent display units together display an image and form a display unit group, wherein N is a positive integer larger than 1, and
each display unit group displays a same image.

2. The display device according to claim 1, wherein:
each display unit includes a plurality of pixel units arranged in a pixel unit matrix, wherein each pixel unit includes a display region and a non-display region;
each pixel unit is equally divided into N portions along a row direction of the pixel unit matrix; and
along the row direction of the pixel unit matrix, the display region of the pixel units in each display unit in the display unit group may be sequentially disposed at a first portion to an $N^{th}$ portion.

3. The display device according to claim 2, wherein:
one of the first portion to the $N^{th}$ portion is the display region and remaining portions are the non-display region; and
a black matrix is disposed on top of the non-display region in each pixel unit.

4. The display device according to claim 3, wherein:
each pixel unit includes a thin film transistor (TFT) disposed in the non-display region of the pixel unit and at one side of the black matrix adjacent to a light source.

5. The display device according to claim 1, wherein:
the plurality of display units are arranged in a display unit matrix; and
in at least one of a row direction of the display unit matrix and a column direction of display the unit matrix, the distance between the center of the microlens element and the center of the corresponding display unit gradually increases from the center of the display panel to the edge of the display panel.

6. The display device according to claim 5, wherein:
in at least one of the row direction of the display unit matrix and the column direction of the display unit matrix, a distance between the centers of two adjacent display units is larger than a distance between the centers of two corresponding adjacent microlens elements.

7. The display device according to claim 5, wherein:
in at least one of the row direction of the display unit matrix and the column direction of the display unit matrix, the distance between the centers of two adjacent display units is smaller than the distance between the centers of two corresponding adjacent microlens elements.

8. The display device according to claim 1, wherein:
the plurality of display units are arranged in multiple rows and multiple columns;
the display units disposed in two adjacent rows are staggered in a column direction; and
in at least one of a row direction and the column direction, the distance between the center of the microlens element and the center of the corresponding display unit gradually increases from the center of the display panel to the edge of the display panel.

9. The display device according to claim 8, wherein:
in at least one of the row direction and the column direction, the distance between the centers of two adjacent display units is larger than the distance between the centers of two corresponding adjacent microlens elements.

10. The display device according to claim 8, wherein:
in at least one of the row direction and the column direction, the distance between the centers of two adjacent display units is smaller than the distance between the centers of two corresponding adjacent microlens elements.

11. The display device according to claim 1, further including:
a plurality of scanning lines providing scanning signals to the pixel units in each of the plurality of the display units; and
a plurality of data lines providing data signals to the pixel units in each of the plurality of the display units.

12. The display device according to claim 11, wherein:
each of the plurality of the display units has its own scanning line and its own data line.

13. The display device according to claim 11, wherein:
the plurality of the display units share the plurality of scanning lines and the plurality of data lines.

14. The display device according to claim 13, further including:
a gate electrode driving circuit having a plurality of cascaded shift registers is disposed on the display panel, wherein the plurality of cascaded shift registers are connected to the corresponding scanning lines respectively and provide the scanning signals to the pixel units in each of the plurality of display units respectively.

15. The display device according to claim 11, further including:
a plurality of gate electrode driving circuits one-to-one corresponding to a plurality of display unit groups,
wherein each gate electrode driving circuit includes a plurality of cascaded shift registers connected to the corresponding scanning lines respectively, and
the plurality of cascaded shift registers provide the scanning signals to the pixel units in the corresponding display unit group respectively.

16. The display device according to claim 1, wherein:
the display panel is one of a liquid crystal display (LCD) panel, a plasma display panel (PDP), a cathode ray tube (CRT) display panel, and an organic light emitting diode (OLED) display panel.

17. The display device according to claim 1, wherein:
the display unit has one of a circular shape, a polygonal shape and an irregular shape.

18. The display device according to claim 1, wherein:
the microlens element includes at least one microlens.

19. The display device according to claim 18, wherein:
the microlens has a hemispherical shape.

* * * * *